(12) United States Patent
Katayama et al.

(10) Patent No.: US 8,555,931 B2
(45) Date of Patent: Oct. 15, 2013

(54) IN-TANK TUBE FOR AUTOMOTIVE FUEL AND METHOD OF PRODUCING THE TUBE

(75) Inventors: Kazutaka Katayama, Kasugai (JP); Koji Mizutani, Ichinomiya (JP); Keita Asai, Iwakura (JP); Tokunori Kobayashi, Nissin (JP)

(73) Assignee: Tokai Rubber Industries, Ltd., Komaki-shi, Aichi (JP)

( * ) Notice: Subject to any disclaimer, the term of this patent is extended or adjusted under 35 U.S.C. 154(b) by 48 days.

(21) Appl. No.: 13/193,198

(22) Filed: Jul. 28, 2011

(65) Prior Publication Data

US 2011/0277867 A1    Nov. 17, 2011

Related U.S. Application Data

(63) Continuation of application No. PCT/JP2011/054364, filed on Feb. 25, 2011.

(30) Foreign Application Priority Data

Mar. 18, 2010    (JP) .................................. 2010-062497

(51) Int. Cl.
    *F16L 9/18*    (2006.01)
(52) U.S. Cl.
    USPC .... 138/121; 138/177; 138/DIG. 7; 428/36.91
(58) Field of Classification Search
    USPC ............ 138/121, 122, DIG. 7, 177; 428/36.9, 428/36.91
    See application file for complete search history.

(56) References Cited

U.S. PATENT DOCUMENTS

| 5,664,608 A | * | 9/1997 | Kawasaki ..................... 138/139 |
| 5,718,965 A | | 2/1998 | Shiroeda et al. |

(Continued)

FOREIGN PATENT DOCUMENTS

| EP | 0397841 A1 | 10/1992 |
| EP | 1 408 268 A1 | 4/2004 |

(Continued)

OTHER PUBLICATIONS

International Search Report for PCT/JP2011/054364, mailing date of Mar. 29, 2011, w/relevance codes.
Chinese Office Action dated May 15, 2013, issued in corresponding Chinese Patent Application No. 201180000821.X, w/English translation.

*Primary Examiner* — Patrick F Brinson
(74) *Attorney, Agent, or Firm* — Westerman, Hattori, Daniels & Adrian, LLP

(57) ABSTRACT

Provided is an in-tank tube excellent in pressure-resisting performance. The in-tank tube is an in-tank tube (1) for an automotive fuel of a monolayer structure, the in-tank tube (1) for an automotive fuel being installed in a fuel tank (2) and having a construction that absorbs displacement of the fuel tank (2) and vibration of a fuel pump (5). Further, the in-tank tube (1) for an automotive fuel is formed into a monolayer structure formed of a resin material using an aliphatic polyamide resin as a main component, and has the following pressure-resisting characteristic (X): (X) when silicone oil is charged as a pressurizing medium into the in-tank tube immersed in a test liquid (Fuel C:methanol=85:15 (volume basis)) at 80° C. for 168 hours, both ends of the in-tank tube are each blocked with a test pipe, and a pressure test is performed at a rate of pressure increase of 1.0 MPa/min and room temperature, a pressure (burst pressure) at which the in-tank tube bursts or the test pipe disconnects is 2.8 MPa or more.

3 Claims, 2 Drawing Sheets

(56) References Cited

U.S. PATENT DOCUMENTS

| | | |
|---|---|---|
| 5,968,665 A | 10/1999 | Shiroeda et al. |
| 6,523,576 B2 * | 2/2003 | Imaeda et al. ............... 138/121 |
| 6,576,312 B1 * | 6/2003 | Ito et al. ..................... 428/36.91 |
| 6,604,551 B2 * | 8/2003 | Nishi et al. .................... 138/137 |
| 2002/0061375 A1 | 5/2002 | Cartledge et al. |
| 2002/0104575 A1 * | 8/2002 | Nishi et al. .................... 138/137 |
| 2002/0134449 A1 * | 9/2002 | Nishi et al. .................... 138/121 |

FOREIGN PATENT DOCUMENTS

| | | |
|---|---|---|
| JP | 04-262186 A | 9/1992 |
| JP | 7-118349 A | 5/1995 |
| JP | 8-174663 A | 7/1996 |
| WO | 90/06467 A1 | 6/1990 |
| WO | 96/32428 A1 | 10/1996 |

* cited by examiner

IN-TANK TUBE FOR AUTOMOTIVE FUEL AND METHOD OF PRODUCING THE TUBE

RELATED APPLICATION

This application is a continuation of International Application No. PCT/JP2011/54364, filed on Feb. 25, 2011, which claims priority to Japanese Patent Application No. 2010-062497, filed on Mar. 18, 2010, the entire contents of which are hereby incorporated by reference.

TECHNICAL FIELD

The present invention relates to an in-tank tube for an automotive fuel installed in a fuel tank and including a bellows structure for absorbing, for example, displacement of the fuel tank and vibration of a fuel pump (hereinafter, appropriately abbreviated as "in-tank tube"), and a method of producing the tube.

BACKGROUND ART

In general, in a fuel pipeline system of an automobile, there is employed such a mechanism that, when an engine is operated, a fuel such as gasoline or an alcohol-added gasoline (gasohol) is sucked from an inside of a fuel tank to be supplied whenever necessary. At this time, the suction of the fuel is carried out with a pump permanently installed in the fuel tank (referred to as "fuel pump"). Further, a hose coupled to the fuel pump in the a fuel tank is called an in-tank tube, and the hose is also permanently installed in the fuel tank as in the case of the fuel pump.

Here, FIG. 1 schematically illustrates an inside appearance of the fuel tank. Reference numeral 1 denotes an in-tank tube (reference numeral 1' denotes an in-tank tube on a return side typically provided in the case of a diesel car, and the in-tank tube 1' is equal to the in-tank tube 1), reference numeral 2 denotes the fuel tank, reference numeral 3 denotes the fuel, reference numeral 4 denotes a filter, reference numeral 5 denotes the fuel pump, reference numeral 6 denotes a jet pump, reference numeral 7 denotes a housing made of polyoxymethylene (POM), and reference numeral 8 denotes a spring. That is, the fuel 3 in the fuel tank 2 passes the filter 4 so as to be fed into the in-tank tube 1 by the fuel pump 5, and is then fed as it is to an external fuel circuit such as an engine. Then, the housing 7 including the in-tank tube 1 and the like is provided with the springs 8 for corresponding to the deformation of the fuel tank 2 due to thermal expansion. In addition, the in-tank tube 1 is typically of a bellows structure as illustrated in the figure for corresponding to the deformation of the fuel tank 2 due to expansion and the absorption of the vibration of the pump. It should be noted that the fuel 3 on the return side is returned into the housing 7 by the Venturi effect of the jet pump 6.

By the way, the outer peripheral surface of the hose as well as the inner peripheral surface of the hose are requested to have resistance against sour gasoline produced by the oxidation of the fuel 3 resulting from the manner in which the in-tank tube 1, which is provided in such state as described above, is used (sour gasoline resistance). In view of the foregoing, measures have been conventionally taken to meet such request by forming the entirety of the hose from a material excellent in, for example, sour gasoline resistance such as a polyamide 11 (PA11) or a polyamide 12 (PA12) (see, for example, Patent Literature 1).

CITATION LIST

Patent Literature

PLT 1: JP 07-118349 A

SUMMARY OF INVENTION

Technical Problem

The in-tank tube 1 and the fuel pump 5 illustrated in FIG. 1 described above are typically coupled to each other with such a connector 10 as illustrated in FIG. 2. A press-fit portion 11 of the connector 10 is coupled to the in-tank tube 1 by being pressed into an end of the in-tank tube 1, and an engaging portion 12 of the connector 10 is coupled to a portion to be engaged of the fuel pump 5 by engaging with the portion.

By the way, in recent years, there has been a trend toward using an alcohol-added gasoline, as a result of which the heat quantity of the gasoline has tended to become insufficient. In addition, the following trend has been observed in order to compensate for the fuel insufficiency: the aperture of the in-tank tube is increased so that the flow rate of the alcohol-added gasoline may be raised.

However, such serious problems as described below have been arising. The pressure-resisting performance of the in-tank tube decreases due to the increase in the aperture of the in-tank tube, or the end of the in-tank tube 1 disconnects from the press-fit portion 11 of the connector 10 due to, for example, the pressure of the fuel pump.

The present invention has been made in view of such circumstances, and an object of the present invention is to provide an in-tank tube excellent in pressure-resisting performance and a method of producing the tube.

Solution to Problem

In order to achieve the above-mentioned object, a first aspect of the present invention concerns an in-tank tube for an automotive fuel of a monolayer structure, the in-tank tube for an automotive fuel being installed in a fuel tank and having a construction that absorbs displacement of the fuel tank and vibration of a fuel pump, in which the in-tank tube for an automotive fuel is formed into the monolayer structure formed of a resin material using an aliphatic polyamide resin as a main component, and has the following pressure-resisting characteristic (X):

(X) when silicone oil is charged as a pressurizing medium into the in-tank tube immersed in a test liquid (Fuel C:methanol=85:15 (volume basis)) at 80° C. for 168 hours, both ends of the in-tank tube are each blocked with a test pipe, and a pressure test is performed at a rate of pressure increase of 1.0 MPa/min and room temperature, a pressure (burst pressure) at which the in-tank tube bursts or the test pipe disconnects is 2.8 MPa or more.

Further, a second aspect of the present invention is a method of producing an in-tank tube for an automotive fuel of a monolayer structure, the in-tank tube for an automotive fuel being installed in a fuel tank and having a construction that absorbs displacement of the fuel tank and vibration of a fuel pump, the method including the steps of: extruding a resin material using an aliphatic polyamide resin as a main component into a tubular shape; irradiating the tube with an electron beam; and subjecting the tube irradiated with the electron beams to heat treatment at a temperature equal to or more than a glass transition temperature (Tg) of the aliphatic polyamide resin and less than a melting point of the resin.

That is, the inventors of the present invention have made extensive studies to obtain an in-tank tube excellent in pressure-resisting performance. In the course of the studies, the inventors have conceived the following. An aliphatic polyamide is used as a material for forming the in-tank tube, and the aliphatic polyamide is crosslinked by being irradiated with electron beams before its use. However, a sufficient crosslinking effect could not be obtained only by the electron beam irradiation. In view of the foregoing, the inventors have conducted further experiments, and as a result, have found the following fact. When heat treatment is performed after the electron beam irradiation, the crosslinking progresses sufficiently, and hence an in-tank tube excellent in pressure-resisting performance is obtained. Thus, the inventors have reached the present invention. The reason for the foregoing is considered to be as described below. That is, when the aliphatic polyamide is irradiated with the electron beams, radicals are produced by the energy of the electron beams, and hence the crosslinking progresses. As a result, the strength and heat resistance of the polyamide are improved. After only the foregoing electron beam irradiation has been performed, a large number of unreacted radicals still remain because the polymer radicals each have a long lifetime. Accordingly, the heating promotes the crosslinking in an amorphous portion (glass-like portion) where the radicals can freely move around, and hence the strength and pressure resistance of the entire in-tank tube rise. However, when the heat treatment is performed at a temperature equal to or more than the melting point of the polyamide, the crosslinking occurs in a crystal portion as well. The crystalline state of the crystal portion is disturbed by the presence of the crosslinked product thus produced, and hence its crystallinity decreases. As a result, the pressure-resisting performance and the like are correspondingly reduced.

Advantageous Effects of Invention

As described above, the in-tank tube of the present invention is obtained by performing heat treatment at a predetermined temperature after electron beam irradiation. That is, the in-tank tube of the present invention is formed of a resin material using an aliphatic polyamide as a main component and has a predetermined pressure-resisting characteristic (X). Accordingly, even when the aperture of the in-tank tube is increased, for example, the disconnection of the in-tank tube from a connector can be prevented. In addition, in the present invention, the in-tank tube uses the aliphatic polyamide crosslinked by the electron beam irradiation and the heat treatment, and is hence hardly affected by an alcohol, excellent in resistance against an alcohol-added gasoline (alcohol gasoline resistance), and suitable for a bioalcohol fuel expected to become widespread in the future.

In addition, in the present invention, unreacted radicals are consumed by the heat treatment, and hence such a decomposition reaction that the main chain of the aliphatic polyamide is cleaved is suppressed and a change over time of the polyamide hardly occurs. Accordingly, the in-tank tube can: be shipped right away; and exert a necessary function immediately after having been mounted as an automotive part on an automobile. Further, an oligomer, which remains in a large amount unless the aliphatic polyamide resin is subjected to the electron beam irradiation and the heat treatment, crosslinks to have so high a molecular weight as to be hardly extracted into a liquid because the electron beam irradiation and the heat treatment are performed in the present invention. As a result, clogging of an injector can be prevented.

In addition, when the above-mentioned aliphatic polyamide resin is at least one selected from the group consisting of a polyamide 6, a polyamide 6/12 copolymer, a polyamide 11, a polyamide 610, and a polyamide 1010, a good balance is established between the flexibility and pressure-resisting performance of the in-tank tube, and hence the ease with which a target characteristic is obtained is improved.

In addition, when the dose of the electron beam irradiation in the electron beam irradiation step falls within the range of 50 to 300 kGy, the pressure-resisting performance is additionally improved.

DESCRIPTION OF EMBODIMENTS

Next, an embodiment of the present invention is described in detail, provided that the present invention is not limited to the embodiment.

Figure 1:
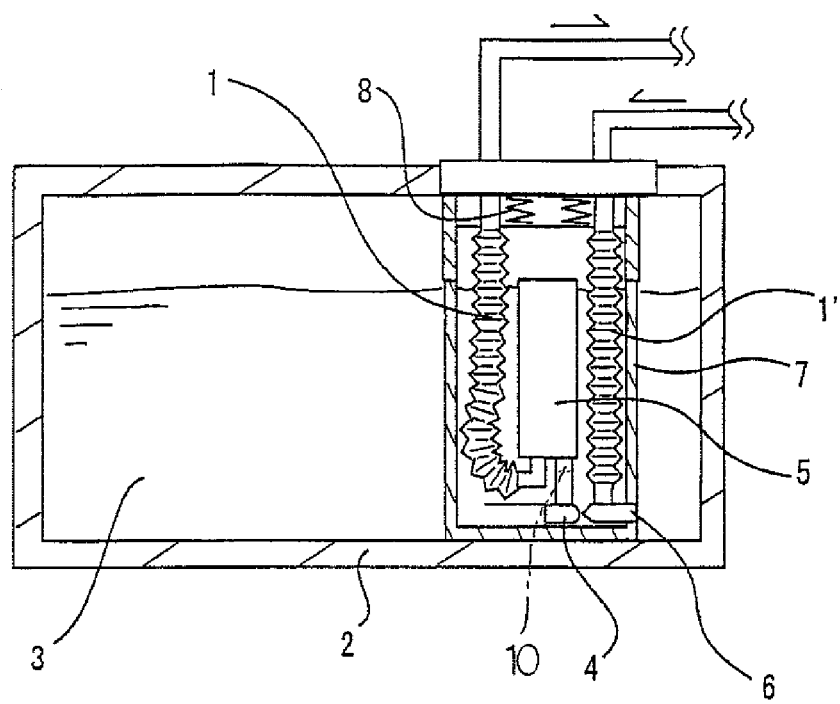
FIG. 1 is an explanatory diagram schematically illustrating the appearance of the inside of the fuel tank of an automobile.

As illustrated in FIG. 1, an in-tank tube of the present invention is installed in a fuel tank 2, and includes a bellows structure that absorbs, for example, the displacement of the fuel tank 2 and the vibration of a fuel pump 5.

It should be noted that the aperture of the in-tank tube of the present invention is increased and hence the dimensions of each portion are changed in association with the increase.

Figure 2:
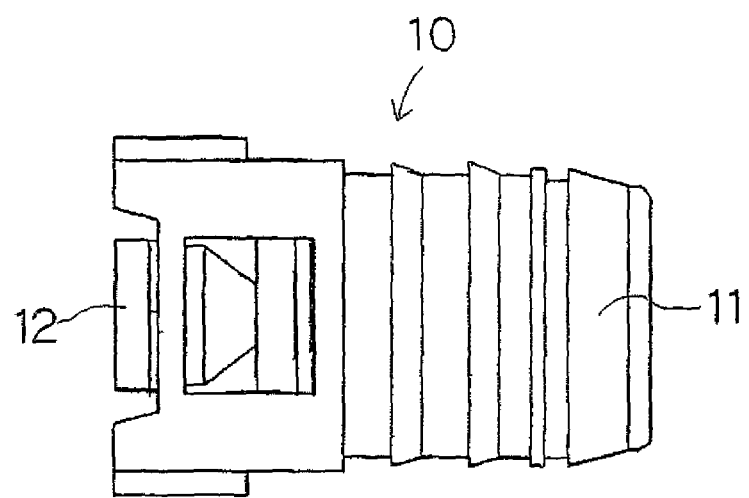
FIG. 2 is an explanatory diagram illustrating a connector for coupling an in-tank tube and a fuel pump.

In addition, the in-tank tube 1 and the fuel pump 5 are typically coupled to each other with such a connector 10 as illustrated in FIG. 2 as described in the foregoing. A press-fit portion 11 of the connector 10 is coupled to the in-tank tube 1 by being pressed into an end of the in-tank tube 1, and an engaging portion 12 of the connector 10 is coupled to a portion to be engaged of the fuel pump 5 by engaging with the portion.

Here, the in-tank tube of the present invention is of a large aperture. In ordinary cases, its inner diameter is set to 3 to 12 mm, suitably 5 to 8 mm, and its wall thickness is set to 0.3 to 1.5 mm, suitably 0.5 to 1.2 mm.

It should be noted that the aperture of the in-tank tube of the present invention can be made smaller than that of the tube of a large aperture, and even in this case, for example, the same pressure resistance-improving effect as that of the tube of a large aperture is exerted.

The in-tank tube is a monolayer structural body formed of a resin material using an aliphatic polyamide resin as a main component.

The term "main component" as used herein, which typically refers to a state in which the aliphatic polyamide resin accounts for more than a half of the resin material, comprehends the case where the resin material is formed only of the aliphatic polyamide resin as well.

<<Aliphatic Polyamide Resin>>

Examples of the above-mentioned aliphatic polyamide resin include a polyamide 6 (PA6), a polyamide 11 (PA11), a polyamide 12 (PA12), a polyamide 66 (PA66), a polyamide 99 (PA99), a polyamide 610 (PA610), a polyamide 612 (PA612), a polyamide 912 (PA912), a polyamide 1010 (PA1010), a copolymer of the polyamide 6 and the polyamide 12 (PA6/12), and a copolymer of the polyamide 6 and the polyamide 66 (PA6/66). Those resins are each used alone, or two or more kinds thereof are used in combination. Of those, PA6, PA11, PA610, PA1010, and PA6/12 are preferred from the viewpoints of pressure-resisting performance and flexibility.

The aliphatic polyamide resin has a bending modulus in the range of preferably 350 to 2,500 MPa, particularly preferably 450 to 2,200 MPa because of the following reasons. That is, when the bending modulus of the aliphatic polyamide resin is excessively small, it tends to have poor mechanical properties. In contrast, when the bending modulus is excessively large, the resin tends to be so hard that product assembly capability deteriorates. It should be noted that the bending modulus is a value measured in conformity with the description of ASTM D790.

The resin material that forms the in-tank tube described above can be blended without a problem with, for example, a plasticizer, an age inhibitor, a crosslinking auxiliary, a pigment, a dye, carbon black, or a lubricant as well as the aliphatic polyamide resin. Those products are each used alone, or two or more kinds thereof are used in combination.

Examples of the above-mentioned plasticizer include ester-based, synthetic plasticizers such as dioctyl phthalate (DOP), di-n-butyl phthalate (DBP), dioctyl adipate (DOA), dibutyl glycol adipate, dibutyl carbitol adipate, and polyester adipate, and n-butylbenzenesulfonamide. Those plasticizers are each used alone, or two or more kinds thereof are used in combination.

With respect to 100 parts by weight (hereinafter, abbreviated as "part(s)") of the aliphatic polyamide resin, the plasticizer is blended in an amount in the range of preferably 3 to 20 parts, particularly preferably 5 to 15 parts.

Examples of the above-mentioned thermal age inhibitor include amine-ketone-based, aromatic secondary amine-based, monophenol-based, bisphenol-based, polyphenol-based, benzimidazole-based, dithiocarbamate-based, dithiocarbamic acid-based, thiourea-based, phosphorous acid-based, organic thioacid-based, xanthogenate-based, and special wax-based age inhibitors. Those age inhibitors are each used alone, or two or more kinds thereof are used in combination.

With respect to 100 parts of the aliphatic polyamide resin, the thermal age inhibitor is blended in an amount in the range of preferably 0.1 to 2 parts, particularly preferably 0.1 to 1 part.

In the present invention, in order to enhance crosslinking efficiency, a crosslinking auxiliary can be blended without a hitch. Examples of the above-mentioned crosslinking auxiliary include hexanediol diacrylate (HDDA), tripropylene glycol diacrylate (TPGDA), diethylene glycol diacrylate (DEGDA), tetraethylene glycol diacrylate (TEGDA), trimethylolpropane triacrylate (TMPTA), glycerol propoxy triacrylate (GPTA), trimethylolpropane ethoxy triacrylate (TMPEOTA), pentaerythritol acrylate (PETA), triallyl isocyanurate (TALC), and trishydroxyethylisocyanuric acrylate (THEICA). Those crosslinking auxiliaries are each used alone, or two or more kinds thereof are used in combination.

With respect to 100 parts of the aliphatic polyamide resin, the crosslinking auxiliary is blended in an amount in the range of preferably 0.1 to 5 parts, particularly preferably 0.3 to 2 parts.

The in-tank tube of the present invention can be produced, for example, as described below. That is, first, the resin material using the aliphatic polyamide resin as a main component is prepared and then extruded into a large-aperture tubular shape with an extruder or the like, and furthermore, a bellows structure is formed in the tube with a corrugator or the like. Next, the tube in which the bellows structure is formed is irradiated with electron beams from an electron beam irradiation apparatus or the like. After that, the resultant is cut into a predetermined length with a cutting machine or the like, and then the cut piece is placed in a heat treat furnace and subjected to heat treatment. Thus, a target in-tank tube can be produced.

<<Electron Beam Irradiation>>

The dose of the electron beam irradiation falls within the range of preferably 50 to 300 kGy, particularly preferably 100 to 250 kGy because of the following reasons. That is, when the dose of the electron beam irradiation is excessively small, a crosslinking effect is small. In contrast, when the dose is excessively large, a tendency that the in-tank tube deteriorates is observed.

<<Heat Treatment>>

With regard to a temperature condition for the heat treatment, the heat treatment must be performed at a temperature equal to or more than the glass transition temperature (Tg) of the aliphatic polyamide resin and less than the melting point of the resin. Although the melting point of the aliphatic polyamide resin varies depending on its kind, the temperature specifically falls within the range of preferably 120° C. or more and less than 220° C., more preferably 120 to 180° C., most preferably 150 to 160° C. This is because of the following reason. That is, when the heat treatment is performed at a temperature equal to or more than the melting point of the aliphatic polyamide resin, the number of crosslinks of a crystal portion of the aliphatic polyamide resin increases, the crystallinity of the portion decreases, and none of the crosslinks of the crystal portion returns to its original structure. As a result, the pressure-resisting performance decreases.

In addition, a time for the heat treatment is preferably 10 to 60 minutes, particularly preferably 20 to 40 minutes because of the following reasons. That is, when the heat treatment time is excessively short, the crosslinking does not progress sufficiently, and hence the extent of the crosslinking varies from place to place. In contrast, when the heat treatment time is excessively long, there is a possibility that the resin is deteriorated.

The in-tank tube of the present invention thus obtained (typically having an inner diameter of 3 to 12 mm and a wall thickness of 0.3 to 1.5 mm) has the following pressure-resisting characteristic (X).

<<Pressure-Resisting Characteristic (X)>>

When silicone oil is charged as a pressurizing medium into the in-tank tube immersed in a test liquid (Fuel C:methanol=85:15 (volume basis)) at 80° C. for 168 hours, both ends of the in-tank tube are each blocked with a test pipe, and a pressure test is performed at a rate of pressure increase of 1.0 MPa/min and room temperature (23° C.), a pressure (burst pressure) at which the in-tank tube bursts or the test pipe disconnects is 2.8 MPa or more, preferably 3.0 MPa or more, particularly preferably 3.2 MPa or more. This is because of the following reason. That is, when the pressure (burst pressure) is excessively small, a problem such as the disconnection of the in-tank tube from the connector arises.

In addition, the in-tank tube of the present invention has a bending modulus in the range of preferably 350 to 2,500 MPa, particularly preferably 450 to 2,200 MPa because of the following reasons. That is, when the bending modulus is excessively small, the mechanical properties of the tube tend to be poor. In contrast, when the bending modulus is excessively large, the tube tends to be so hard that product assembly capability deteriorates. It should be noted that the bending modulus is a value measured in conformity with the description of ASTM D790.

The respective dimensions of the in-tank tube of the present invention, part of which have been described in the foregoing, are more specifically as described below. The thickness of the in-tank tube (thickness in a straight portion at each of both ends) is typically 0.3 to 1.5 mm, preferably 0.5 to 1.2 mm. In addition, the inner diameter of the straight portion falls within the range of preferably 3 to 12 mm, particularly preferably 5 to 10 mm. The outer diameter of the straight portion falls within the range of preferably 4 to 15 mm, particularly preferably 6 to 13 mm. Further, a ratio of a valley portion outer diameter to a peak portion outer diameter "valley portion outer diameter/peak portion outer diameter" at a bellows portion in the hose is preferably set to about 7 mm/10 mm, and a pitch length is preferably set to about 3 mm.

EXAMPLES

Next, examples are described together with comparative examples, provided that the present invention is not limited to these examples.

First, the following materials were prepared prior to the examples and the comparative examples.

<Aliphatic Polyamide Resin (I)>
A polyamide 11 (PA11) (Rilsan BESN BKP20TL manufactured by Arkema, bending modulus: 480 MPa)

<Aliphatic Polyamide Resin (II)>
A polyamide 1010 (PA1010) (Zytel RSCL1000 BK385 manufactured by DuPont, bending modulus: 1,700 MPa)

<Aliphatic Polyamide Resin (III)>
A polyamide 610 (PA610) (Zytel RSLC3090 NC010 manufactured by DuPont, bending modulus: 2,000 MPa)

<Aliphatic Polyamide Resin (IV)>
A polyamide 6/12 copolymer (PA6/12) (UBE Nylon 7034U manufactured by Ube Industries, Ltd., bending modulus: 1,700 MPa)

<Aliphatic Polyamide Resin (V)>
A polyamide 6 (PA6) (UBE Nylon 1030B manufactured by Ube Industries, Ltd., bending modulus: 2,500 MPa)

Example 1

After the polyamide 11 (PA11) as the aliphatic polyamide resin (I) had been subjected to extrusion molding into a tubular shape (inner diameter: 6 mm, outer diameter: 8 mm), a bellows structure (bellows structure portion: 150 mm, valley portion outer diameter/peak portion outer diameter: 7 mm/10 mm, pitch length: 3 mm) was formed with a vacuum forming corrugator (Model 120HS manufactured by Corma) (straight portions at both ends: 10 mm, inner diameter of each of the straight portions at both ends: 6 mm, outer diameter: 8 mm). Next, the resultant was irradiated with electron beams (dose: 250 kGy), and was then cut into a predetermined length with a cutting machine (length: 180 mm). Next, the cut tube was placed in a heat treat furnace (PV(H)-212 manufactured by ESPEC Corp.) and subjected to heat treatment (150° C.×30 minutes). Thus, an in-tank tube (having the inner diameter and the outer diameter described above) was produced.

Examples 2 to 6 and Comparative Examples 1 to 4

In-tank tubes were produced in conformity with Example 1 except that the kind of aliphatic polyamide resin, the electron beam irradiation, conditions for the heat treatment, and the like were changed as shown in Tables 1 and 2 below.

TABLE 1

| | | Example | | | | | |
|---|---|---|---|---|---|---|---|
| | | 1 | 2 | 3 | 4 | 5 | 6 |
| Kind of aliphatic polyamide resin | | (I) | (I) | (II) | (III) | (IV) | (V) |
| Glass transition temperature (° C.) | | 40 | 40 | 56 | 54 | 44 | 47 |
| Melting point (° C.) | | 186 | 186 | 203 | 223 | 198 | 225 |
| Electron beam irradiation (kGy) | | 250 | 100 | 250 | 100 | 100 | 100 |
| Heat treatment (conditions) | | 150° C. × 30 minutes | 120° C. × 30 minutes | 150° C. × 30 minutes | 180° C. × 30 minutes | 150° C. × 30 minutes | 150° C. × 30 minutes |
| Burst pressure (MPa) | Initial room temperature | 5.5 | 5.3 | 7.3 | 8.3 | 5.6 | 6.5 |
| | (evaluation) | ○ | ○ | ○ | ○ | ○ | ○ |
| | After immersion at 80° C. | 3.2 | 3.0 | 3.6 | 4.0 | 3.1 | 3.0 |
| | (evaluation) | ○ | ○ | ○ | ○ | ○ | ○ |
| Extraction amount (%) | | 0.1 | 0.9 | 0.1 | 0.1 | 0.1 | 0.3 |
| (Evaluation) | | ○ | ○ | ○ | ○ | ○ | ○ |

TABLE 2

| | | Comparative Example | | | |
|---|---|---|---|---|---|
| | | 1 | 2 | 3 | 4 |
| Kind of aliphatic polyamide resin | | (I) | (I) | (I) | (V) |
| Glass transition temperature (° C.) | | 40 | 40 | 40 | 47 |
| Melting point (° C.) | | 186 | 186 | 186 | 225 |
| Electron beam irradiation (kGy) | | — | 80 | 250 | — |
| Heat treatment (conditions) | | — | — | 200° C. × 30 minutes | — |
| Burst pressure (MPa) | Initial room temperature | 3.6 | 3.5 | 3.5 | 4.3 |
| | (evaluation) | x | x | x | x |
| | After immersion at 80° C. | 2.7 | 2.5 | 1.9 | 2.2 |
| | (evaluation) | x | x | x | x |
| Extraction amount (%) | | 1.4 | 1.2 | 0.2 | 0.7 |
| (Evaluation) | | x | x | ○ | ○ |

The in-tank tubes of the examples and the comparative examples thus obtained were each evaluated for the respective characteristics in accordance with the following criteria. Tables 1 and 2 above show those results as well.

<<Burst Pressure>>

<Initial Room Temperature (23° C.)>

Silicone oil was charged as a pressurizing medium into an in-tank tube, and then both ends of the in-tank tube were each blocked with a test pipe. Then, a pressure test was performed at a rate of pressure increase of 1.0 MPa/min and room temperature (23° C.) so that the pressure (burst pressure) at which the in-tank tube burst or the test pipe disconnected was measured.

A pressure (burst pressure) of 3.7 MPa or more was evaluated as ○, and a pressure of less than 3.7 MPa was evaluated as x.

<After Immersion at 80° C.>

After having been immersed in a test liquid (Fuel C:methanol=85:15 (volume basis)) at 80° C. for 168 hours, an in-tank tube was taken out of the test liquid. Silicone oil was charged as a pressurizing medium into the in-tank tube, and then both ends of the in-tank tube were each blocked with a test pipe. Then, a pressure test was performed at a rate of pressure increase of 1.0 MPa/min and room temperature (23° C.) so that the pressure (burst pressure) at which the in-tank tube burst or the test pipe disconnected was measured.

A pressure (burst pressure) of 2.8 MPa or more was evaluated as ○, and a pressure of less than 2.8 MPa was evaluated as x.

<Extraction Amount>

Each in-tank tube was cut into a square about 1 mm on a side, and was then weighed so as to have a weight of 10 g. The cut tube was subjected to Soxhlet extraction at a water bath temperature of 80° C. with methanol for 18 hours. The extract was dropped into cold water whose amount was 30 times as large as that of the extract, and then the mixture was left at rest in a refrigerator for 8 hours so that an opaque precipitate was produced. The precipitate was separated by suction filtration, and was then vacuum-dried at 100° C. for 24 hours. After that, its weight was measured.

An extraction amount of 0.9% or less was evaluated as ○, and an extraction amount in excess of 0.9% was evaluated as x.

The results of Tables 1 and 2 above show that Examples 1 to 6 may each be able to prevent the disconnection of the in-tank tube from a connector or the like because the examples each have a burst pressure after immersion at 80° C. of 2.8 MPa or more. In addition, each of Examples 1 to 6 showed a small extraction amount, and was hence excellent in methanol permeation resistance.

In contrast, each of the products of the comparative examples was poor in pressure-resisting performance because each of the products had a burst pressure after immersion at 80° C. of less than 2.8 MPa, which was a small burst pressure. In addition, each of Comparative Examples 1 and 2 showed a large extraction amount, and was hence poor in methanol permeation resistance.

It should be noted that the above-mentioned examples, which have shown specific embodiments in the present invention, are merely examples and should not be construed as being limitative. In addition, all modifications belonging to the scope equivalent to the scope of claims fall within the scope of the present invention.

INDUSTRIAL APPLICABILITY

The in-tank tube for an automobile of the present invention is a monolayer structural body having a construction (such as a bellows structure) that absorbs, for example, the displacement of a fuel tank and the vibration of a fuel pump, and the tube is used by being installed in the fuel tank of an automobile or the like.

REFERENCE SIGNS LIST 1 in-tank tube
2 fuel tank
3 fuel
4 filter
5 fuel pump
6 jet pump
7 housing
8 spring

The invention claimed is:

1. An in-tank tube for an automotive fuel of a monolayer structure, the in-tank tube for an automotive fuel being installed in a fuel tank and having a construction that absorbs displacement of the fuel tank and vibration of a fuel pump, wherein the in-tank tube for an automotive fuel has a monolayer structure formed of a resin material using an aliphatic polyamide resin as a main component, has a bellows structure subjected to electron beam irradiation and heat treatment, and has the following pressure-resisting characteristic (X):

(X) when silicone oil is charged as a pressurizing medium into the in-tank tube immersed in a test liquid (Fuel C:methanol=85:15 (volume basis)) at 80° C. for 168 hours, both ends of the in-tank tube are each blocked with a test pipe, and a pressure test is performed at a rate of pressure increase of 1.0 MPa/min and room temperature, a pressure (burst pressure) at which the in-tank tube bursts or the test pipe disconnects is 2.8 MPa or more.

2. An in-tank tube for an automotive fuel according to claim 1, wherein the aliphatic polyamide resin comprises at least one selected from the group consisting of a polyamide 6, a polyamide 6/12 copolymer, a polyamide 11, a polyamide 610, and a polyamide 1010.

3. An in-tank tube for an automotive fuel according to claim 1, wherein the aliphatic polyamide resin comprises at least one selected from the group consisting of a polyamide 6, a polyamide 6/12 copolymer, a polyamide 11, a polyamide 610, and a polyamide 1010.

* * * * *